March 11, 1969   H. A. KERMICLE   3,432,764
SPECIALIZED ELECTROMETER CIRCUIT
Filed Nov. 20, 1967

INVENTOR.
Harold A. Kermicle
BY
ATTORNEY.

United States Patent Office 3,432,764
Patented Mar. 11, 1969

3,432,764
SPECIALIZED ELECTROMETER CIRCUIT
Harold A. Kermicle, Oak Ridge, Tenn., assignor to the United States of America as represented by the United States Atomic Energy Commission
Filed Nov. 20, 1967, Ser. No. 684,134
U.S. Cl. 330—87                              3 Claims
Int. Cl. H03f 1/36, 3/52

ABSTRACT OF THE DISCLOSURE

A specialized D.C. electrometer amplifier of the degenerative-feedback type has been provided in which noise degeneration is made independent of the amount of input capacity. The conventional input resistor network is grounded and the feedback voltage is impressed on the electrometer tube cathode, allowing the electrometer tube and its output circuitry to be made floating with respect to ground potential.

Background of the invention

This invention was made during the course of, or under, a contract with the U.S. Atomic Energy Commission.

The present invention relates generally to improvements in electrometer circuits of the kind employing degenerative feedback. More particularly, it relates to an electrometer circuit whose noise-degeneration requirements are independent of input capacity.

When measuring very small ionization currents with an electrometer amplifier, for example, the currents generated by the impingement of positive ions on a collector electrode of a mass spectrometer ion chamber, there are certain demands placed upon the input of the electrometer amplifiers so that it does not modify the detecting characteristics of the collector. The collector is connected in series with an ultra-high-value input resistor, approximately $10^{12}$ ohms, and the voltage drop across the resistor is measured. Therefore, the input resistance of the electrometer must be much greater than $10^{12}$ ohms so that it will not modify the circuit resistance. Typically, this is accomplished by connecting the input signal to the control grid of an electrometer tube which forms one leg of a bridge circuit having a pair of input terminals connected respectively to the positive and negative (grounded) terminals of a regulated power supply and a pair of output terminals connected to a differential input operational amplifier. The output of the electrometer amplifier is degeneratively fed back to the input of the electrometer tube through the input resistor and the circuit is adjusted so as to maintain the electrometer input at zero volts. In other words, the circuit responds by applying an opposite and essentially equal voltage to the electrometer tube control grid, thus maintaining the grid bias at essentially its original value.

If noise, a high-frequency voltage spike, for example, occurs in the input signal or in the amplifier network, the circuit must degenerate this by immediately feeding back the corresponding spike appearing in the circuit output. If, however, the signal source to the electrometer tube has a large capacity, which is usually the case in an ion chamber, the feedback signal is in part shunted to ground and degeneration is impaired. This effect can be offset to a limited extent by paralleling the load resistor with a suitable sized capacitor, but this in turn increases the over-all time constant of the amplifier circuit. In many applications the circuit input capacity is so large that the designer is faced with the alternatives of an intolerable high noise level or, if appreciable capacity is added across the input resistor, of a prohibitively long circuit response time, sometimes several minutes. Thus, it can be seen that noise degeneration in the conventional electrometer amplifier is dependent upon the input capacity.

Summary of the invention

The present electrometer circuit provides 100% feedback for noise degeneration, despite large input capacities, and provides acceptable response times. The invention comprises the improvement of the above-described prior art electrometer amplifier by grounding the input resistor network connected to the grid electrode of the electrometer tube and connecting the output of the amplifier to an input terminal of the input bridge circuit to provide degenerative feedback and allow the feedback loop to be floating with respect to ground.

It is, therefore, an object of the present invention to provide an improved electrometer amplifier in which noise degeneration is freed from its usual dependence upon input capacity.

Further, it is an object of the present invention to provide an electrometer amplifier with both a high degree of noise degeneration and acceptable response times.

Other objects and many of the attendant advantages of the present invention will become evident from the following description when taken in conjunction with the accompanying drawings, wherein like reference numerals indicate similar items throughout the figures.

Description of the preferred embodiment

Figure 1:
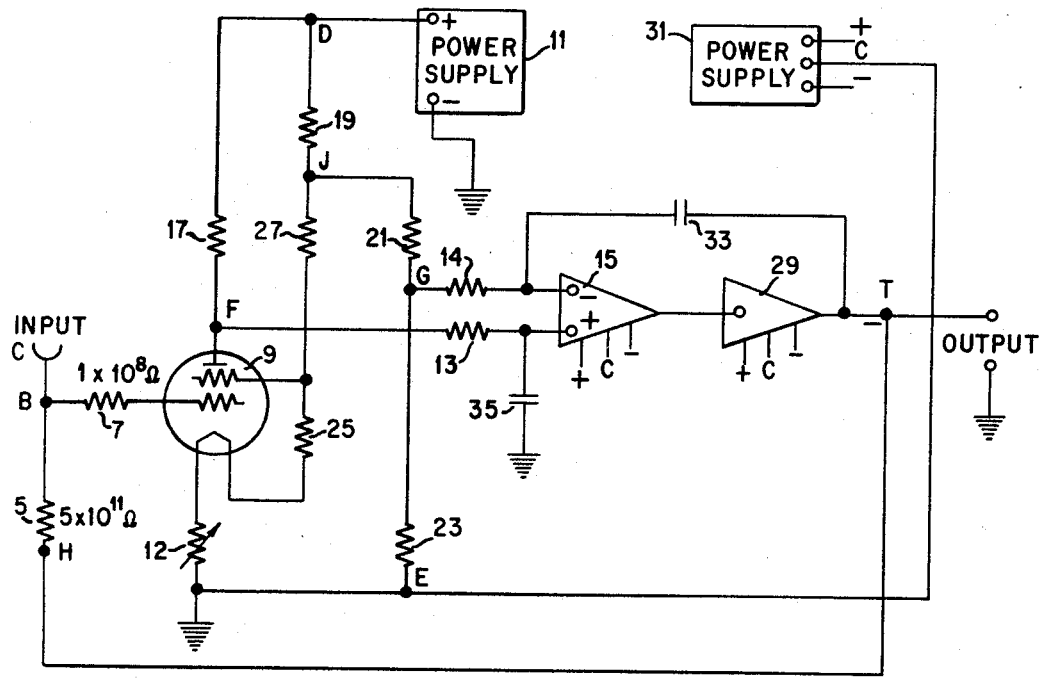
FIG. 1 is a schematic diagram of a conventional prior art electrometer-type amplifier.

FIG. 1 represents a conventional, 100% feedback, direct-current amplifier designed to measure small currents generated by the impingement of positive ions on a collector electrode C. Although the circuit of FIG. 1 is designed particularly for the measurement of mass spectrometer ion currents, it exemplifies certain limitations common to conventional electrometer amplifiers.

As shown, the above-mentioned collector C is connected directly to terminal B of an ultra-high-value input resistor 5, from which the input voltage for the amplifier is taken. Terminal B also is connected, through a limiting resistor 7, to the grid of an electrometer tube 9. The electrometer tube is incorporated in one leg of a bridge whose input terminals D, E are connected respectively to the positive and the negative (grounded) terminals of a regulated power supply 11. Connected between terminal E and the return leg of the electrometer cathode is a bias-adjusting resistor 12, or zero control. The output terminals F, G of the bridge are connected as the input to a differential-input operational amplifier 15 through resistors 13 and 14, respectively. Terminal F of the bridge (i.e., the electrometer cathode) is connected to the positive terminal of amplifier 15.

The remainder of the bridge consists of resistor 17 connected between terminals F and D, resistors 19 and 21 serially connected between terminals D and G, and resistor 23 connected between terminals G and E. The screen grid of tube 9 is connected to the cathode through resistor 25 and to a center tap J of bridge leg D–G through a resistor 27 to maintain proper screen grid bias.

As shown, the output of operational amplifier 15 is transmitted through a current amplifier 29, whose output terminal T is connected to terminal H of the input resistor 5 to complete a feedback loop. The amplifiers 15 and 29 are provided with a separate ground-referenced power supply 31. A capacitor 33 is connected from the negative terminal of amplifier 15 to output terminal T to provide further noise degeneration by integration. A capacitor 35 is connected between ground and the positive terminal of amplifier 15 to prevent circuit oscillation.

Prior to the application of an input signal to the above-mentioned collector C, the zero control 12 is adjusted manually so that output terminal T is at zero volts with respect to ground. This makes input terminal B zero with respect to ground, since this terminal is tied to T through the feedback loop. At this time the bias on the electrometer control grid is equal to the voltage drop across the biasing network.

If now an input signal is received (i.e., if ions impinge on collector C), there will be a corresponding current flow through the input resistor 5, swinging B in the positive direction with respect to ground. Being designed for 100% feedback, the over-all circuit responds immediately by driving terminal T sufficiently negative to restore the voltage at terminal B to essentially its original value. In other words, the circuit responds by applying an opposite and essentially equal voltage to terminal B, thus maintaining the control grid bias of tube 9 at essentially its original value.

If noise (e.g., a high-frequency voltage spike) occurs in the input signal or in the electrometer network, the circuit must degenerate this by immediately feeding back to terminal B the corresponding spike appearing in the circuit output. If, however, the signal source to the electrometer has a large input capacity (capacitance to ground), the feedback signal is in part shunted to ground and degeneration is impaired. This effect can be offset to a limited extent by paralleling resistor 5 with a suitably sized capacitor, but this in turn increases the time constant of the collector circuit. In many applications the capacity is so large that the designer is faced with the alternatives of an intolerably high noise level or, if appreciable capacity is added across the input resistor, of a prohibitively long circuit response time—sometimes several minutes.

Figure 2:
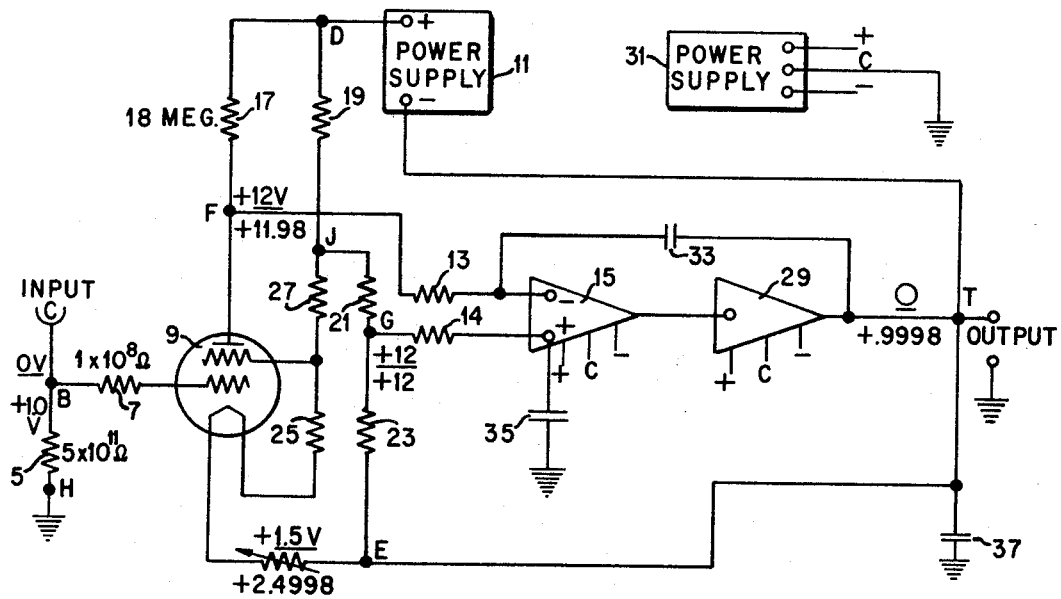
FIG. 2 is a schematic diagram of the circuit of FIG. 1 as modified according to the present invention.

FIG. 2 illustrates one way of modifying the circuit of FIG. 1 in accordance with this invention. The modified circuit provides 100% feedback, but noise degeneration is freed from its usual dependence on input capacity. Thus, despite large input capacities, the circuit can be designed to operate with both a high degree of noise degeneration and with acceptable response times.

Comparing FIGS. 1 and 2, wherein like parts are identically numbered, in the modified circuit, terminal H of the input resistor 5 is connected to ground. The negative terminal of the electrometer power supply 11 and terminal E of the bridge is connected to terminal T to form a circuit which is floating with respect to ground. The floating circuit includes all but the ground-referenced portions of the circuit. The ground-referenced portions are the input resistor 5, power supply 31, and amplifiers 15 and 29. In a preferred form of the modified circuit, the supply 11 is a highly regulated, low-capacitance supply such as the Acopian, Model 903, 75-volt regulated power supply, and a capacitor 37 is connected between the floating circuit and ground to bypass any ripple appearing between power supply 11 and ground. As shown in FIG. 2, the bridge output terminals F and G connections to amplifier 15 have been interchanged so that deflections of bridge terminal F now are applied to the negative input of amplifier 15. With this arrangement, amplifier 15 inverts the polarity of its input signal.

In the modified circuit shown in FIG. 2, the input resistor 5 and the input capacity no longer are in the feedback loop. The entire floating circuit, on the other hand, is part of the loop, since bridge terminal E is connected to terminal T. To illustrate a typical operation of this circuit, assume that no input signal is present and that the zero adjustment 12 has been adjusted for zero output at terminal T. The amount of cathode-to-grid bias of tube 9 obtained under these conditions will be referred to as the pre-set value. If an input signal from collector C now swings terminal B positive, output terminal T and the floating circuit are swung more positive by an amount sufficient to maintain the cathode-to-grid voltage at essentially the preset value. In other words, the feedback arrangement of FIG. 1 maintains the preset grid bias by restoring the zero-voltage condition at terminal B, whereas the feedback arrangement of FIG. 2 maintains a preset grid bias by adjustment of the potential of the cathode with respect to ground. In the latter arrangement, the input resistor 5 and its associated capacity are not included in the feedback loop. Thus, noise degeneration is independent of input capacity, and the circuit can be designed with a suitably large range of damping capacity 33 to degenerate noise in amplifiers 15 and 29 without affecting the input circuitry. Assuming that the circuits of FIGS. 1 and 2 have identical input sources and input resistors 5, the circuit of FIG. 2 will operate with at least 50% less noise but with virtually the same response time.

Various illustrative voltages are shown at selected points in the circuit of FIG. 2. The voltages underlined represent quiescent-state voltages, the zero control 12 having been adjusted for zero output at terminal T. The control grid bias for this condition is approximately —1.5 volts—the drop across zero-control 12. If an input signal now swings input terminal B one volt positive with respect to ground, the output terminal T is swung positive by essentially the same amount, raising the cathode potential of tube 9 relative to ground sufficiently to maintain the control grid bias at essentially the preset value of —1.5 volts.

In addition to its primary advantage of making noise degeneration requirements independent of input capacity, the circuit of FIG. 2 also is very easy to calibrate or test. For example, a low-impedance voltage source can be connected between terminal B and ground, and a measurement made of the voltage differential between terminals B and T. As explained, the differential normally will be essentially zero, so that a deviation from normal operation will be easy to detect. Calibration and testing of the circuit of FIG. 1 can be accomplished only with considerably more difficulty.

As mentioned, in the circuit of FIG. 1 current flow through the input resistor 5 produces negligible voltage deflection at terminal B, whereas appreciable deflection takes place in the circuit of FIG. 2. This is not necessarily a disadvantage in the second case, but merely indicates that the improved circuit of FIG. 2 can be used also in different applications.

The circuit of FIG. 2 has been illustrated in terms of 100% feedback arrangement, but it can easily be adapted to provide fractional feedback. Thus, it will be seen that a specialized electrometer circuit has been provided with improved noise degeneration by freeing its usual dependence upon input capacity and with acceptable response times.

What is claimed is:

1. In an electrometer amplifier of the degenerative-feedback type including an electrometer tube having an anode, cathode, and grid electrodes, a bridge circuit having a pair of input and output terminals, said electrometer tube being connected in one leg of said bridge circuit, a power supply having its outputs connected between said input terminal pair of said bridge circuit, and output circuit means connected to said output terminal pair of said bridge circuit, the improvement comprising: a resistor network connected between said grid electrode of said tube and ground potential for receiving input signals to be amplified; and means connected the output of said output circuit means to one of said input terminals of said bridge circuit for providing degenerative feedback, said one terminal being at a potential floating with respect to ground.

2. An electrometer amplifier as set forth in claim 1 wherein said means connecting the output of said output circuit means includes a variable resistor connected between said cathode electrode of said electrometer tube and said output of said output circuit means so that the bias voltage of said grid of said electrometer tube is initially set at a preselected value.

3. An electrometer amplifier as set forth in claim 2 further including a capacitor connected between said output of said output circuit means and ground potential for bypassing ripple from said power supply to ground.

References Cited

UNITED STATES PATENTS 3,320,533   5/1967   Watters _____ 324—123

ROY LAKE, *Primary Examiner.*

J. B. MULLINS, *Assistant Examiner.*

U.S. Cl. X.R

330—98, 146; 324—123